United States Patent [19]

Cook

[11] 4,178,759
[45] Dec. 18, 1979

[54] ION REPULSION ENGINE AND METHOD OF OPERATING SAME

[76] Inventor: Billy G. Cook, 140 E. Millan St., Chula Vista, Calif. 92010

[21] Appl. No.: 894,474

[22] Filed: Apr. 7, 1978

[51] Int. Cl.$^2$ .............................................. F03G 7/00
[52] U.S. Cl. ........................................ 60/721; 310/10
[58] Field of Search ............................ 60/721; 310/10

[56] References Cited

U.S. PATENT DOCUMENTS

| 3,585,420 | 6/1971 | Gourdine | 310/10 |
| 4,087,976 | 5/1978 | Morrow, Jr. | 60/721 X |

Primary Examiner—Allen M. Ostrager
Attorney, Agent, or Firm—Frank D. Gilliam

[57] ABSTRACT

A reciprocating engine utilizing the mutual repulsion of charged air particles to drive a work-producing means. The engine has pistons reciprocating in cylinders with cylinder spaces between cylinder heads and the pistons. A first enclosed porous conductive electrode is located in fluid flow communication with the cylinder space, typically within the cylinder space itself. The first porous electrode is electrically connected to a second conductive porous electrode in a separate housing. Air is admitted into the first electrode while fuel is admitted into the second electrode. As the air in the cylinder space and first electrode is compressed as the piston moves toward the cylinder head, a current flow takes place from the first electrode to the second electrode because of valance attraction between fuel molecules and oxygen electrons resulting in the ionization of oxygen and fuel. Preferably, the two electrodes are maintained at an elevated temperature to enhance the air/fuel reaction to provide improved ionization. An electrochemical reaction occurs similar to that which occurs in fuel cells. The mutual repulsion of the charged ions in the cylinder space and first electrode produces a strong force on the piston, in accordance with Coulomb's Law, resulting in a piston power stroke. The ionized gases from the cylinder and the external housing are exhausted to a combustion chamber for the completion of the air/fuel chemical reaction. During the initial stages of the compression stroke, premature ionization may be prevented by inducing a potential in the interelectrode conductor opposite to that produced during ionization.

11 Claims, 12 Drawing Figures

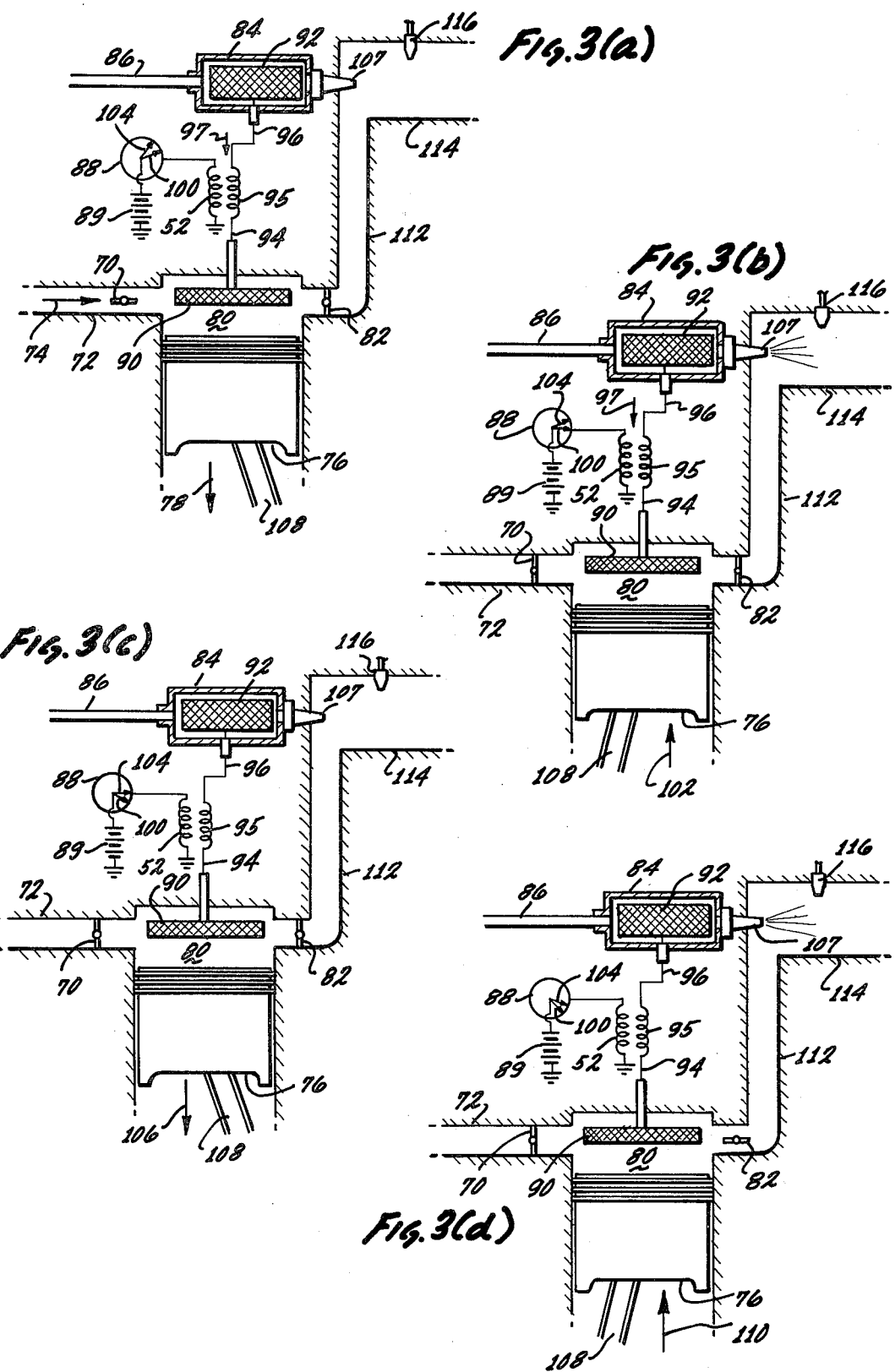

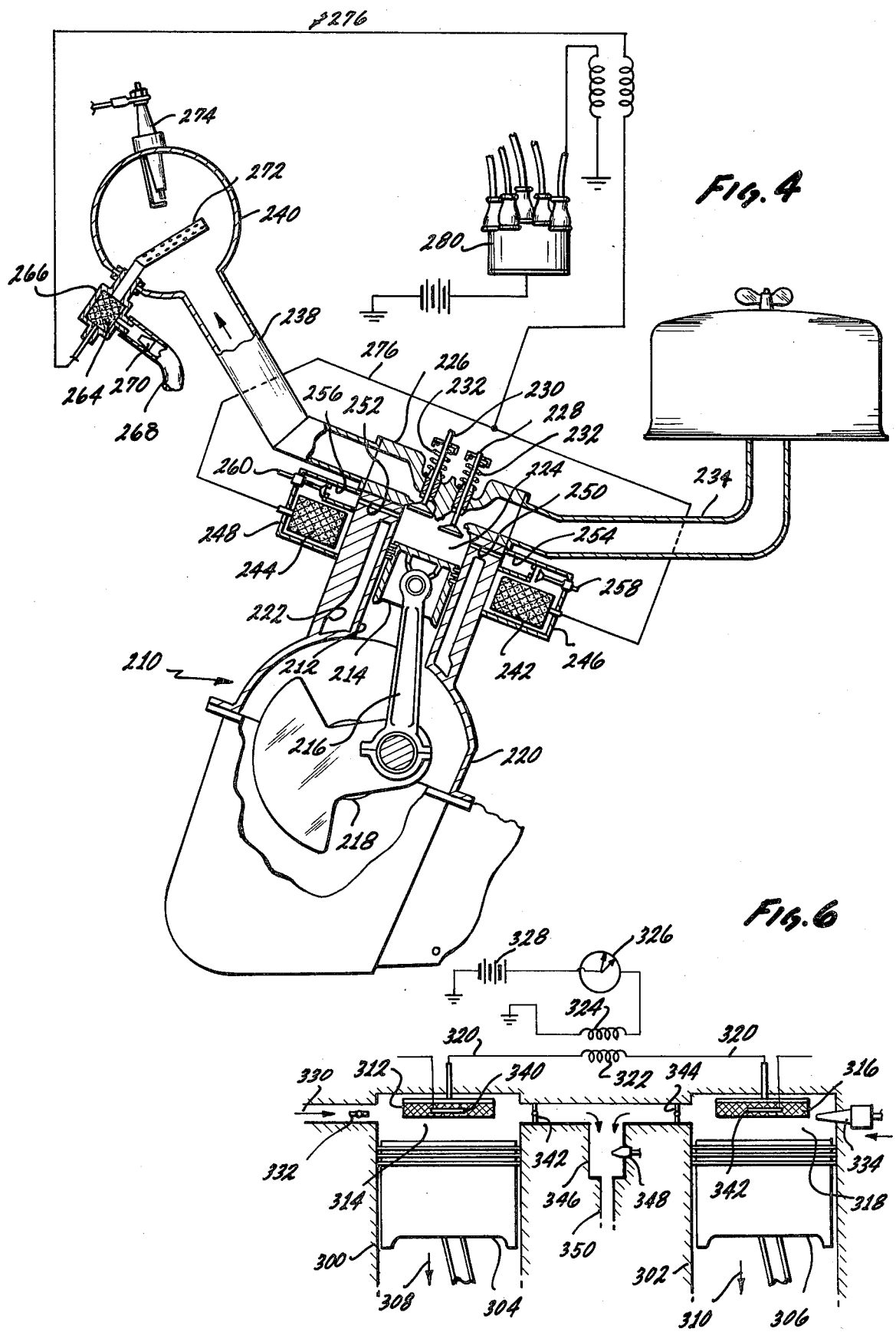

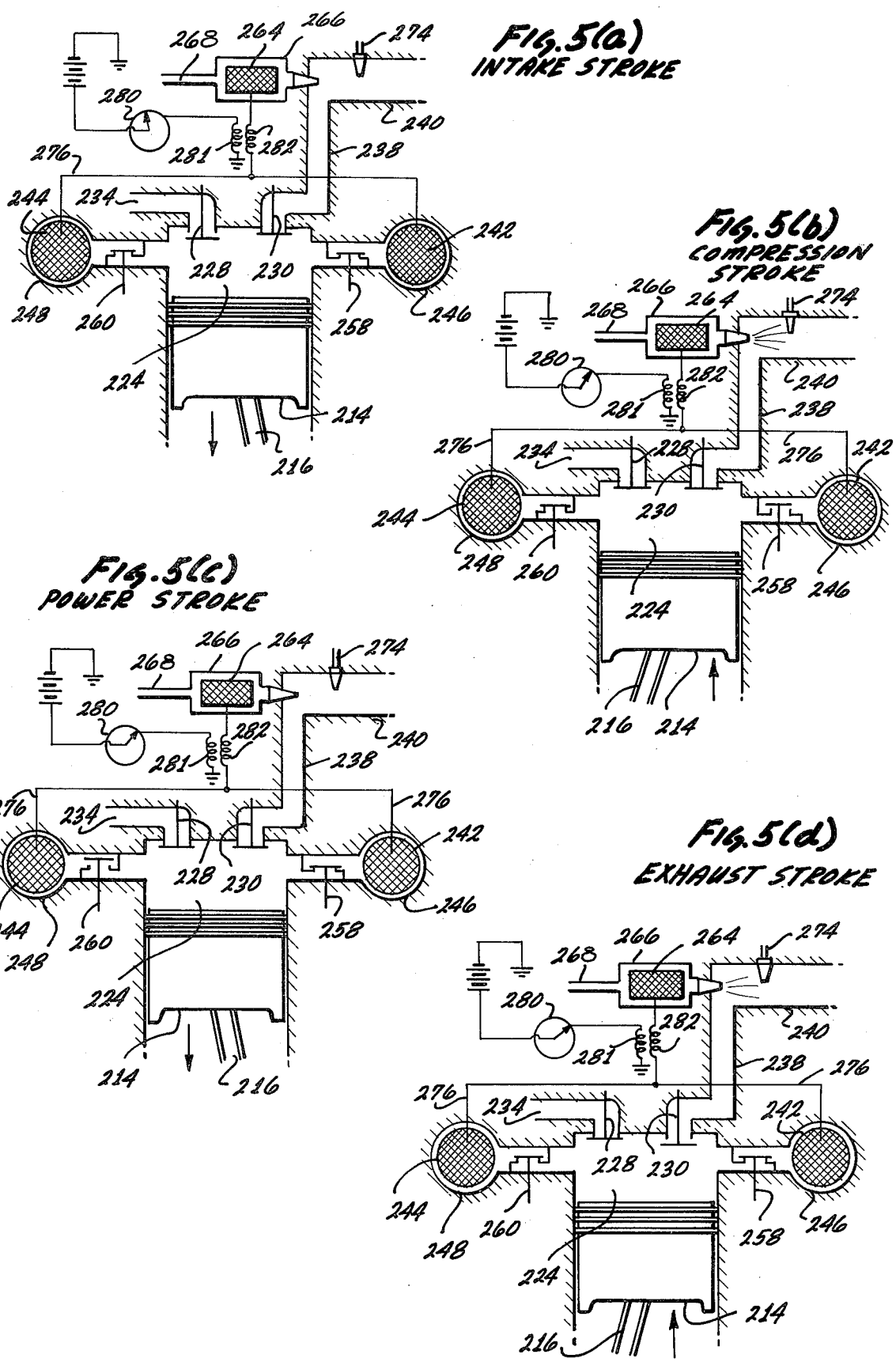

ION REPULSION ENGINE AND METHOD OF OPERATING SAME

BACKGROUND OF THE INVENTION

This invention related in general to work-producing reciprocating engines and, more specifically, to a reciprocating engine in which gas expansion work is performed by ion repulsion.

Reciprocating engines in which internal combustion of a fuel/air mixture in the volume between a cylinder head and a moving piston generates forces on the piston by gas expansion have long been in use and have reached a high state of development. Such engines are mechanically sturdy and long lived and can be rapidly and economically manufactured. Until recently, such internal combustion reciprocating engines were considered to be the optimum for many purposes, such as in powering automobiles and trucks.

The internal combustion engine converts the chemical energy of the fuel to heat which generates pressure to perform work in accordance with the well-known gas laws. However, heat, being generally recognized as the lowest form of energy, introduces large unavoidable energy losses through the exhaust gases and the engine cooling means. The energy conversion efficiency of such engines is usually much less than 40%. Until recently such internal combustion reciprocating engines were considered to be quite satisfactory for many purposes, such as in the powering of automobiles and trucks.

Recently, however, additional shortcomings of the internal combustion engine have become apparent as concern over air pollution has increased. The need for additives such as tetraethyl lead to increase octane ratings has introduced a considerable amount of lead into the atmosphere. Unburned hydrocarbons and other agents such as nitrous oxides are also emitted by internal combustion engines. Because of the types of fuels used, often mixtures of hydrocarbons and other agents, and the high temperatures of combustion, many of the pollutants in the engine exhaust are difficult to control. The addition of emission controls to the engine causes a considerable additional loss in energy conversion efficiency and units such as catalytic converters may even themselves be sources of additional pollutants.

The rising cost and probable shortages of oil-derived fuels for internal-combustion engines are becoming increasingly important. The use of fuels, such as hydrogen produced by the disassociation of water or alcohols derived from organic materials may become necessary.

Ionization of fuel introduced into internal combustion engines has been proposed in U.S. Pat. No. 2,766,582 as a technique for improving engine efficiency. Apparently, ionization of the air/fuel mixture in the cylinder is induced by an imposed voltage. While this may produce a slight increase in cylinder pressure and slightly better mixing of fuel and air, all of the fuel consumption and air pollution problems of internal combustion engines remain.

Attempts have been made to develop alternative engines which would be less polluting, more fuel efficient and less dependent on oil-based fuels. As yet, none of these has been successful in automobile and truck applications.

Fuel cells have been developed in recent years primarily as a source of electrical power. In typical fuel cells, oxygen and a fuel such as hydrogen are introduced into spaced porous catalytic electrodes separated by an electrolyte solution. Electron flow through a conductor connecting the two electrodes occurs as the fuel and oxygen are ionized. The chemical reaction is completed when the ions migrate to each other through the electrolyte. The reaction is cool, since energy had been given up through the work performed by the electrons or current flowing through the conductor to a load. Fuel cells have a number of advantages over internal combustion engines in more complete combustion resulting in less or no polluting emissions and high thermal efficiency. Attempts have been made to operate automobiles with DC motors powered by fuel cells. However, the porous electrodes and electrolytes tend to be short lived and the fuel cells must be excessively large and heavy in order to supply sufficient electrical power to the drive motors. This technology is still in its infancy.

Thus, there is a continuing need for improved engines which can make use of the well-developed body of reciprocating engine technology while providing improved operating efficiency, lower polluting emissions and a wider choice of fuels.

SUMMARY OF THE INVENTION

The above problems, and others, are overcome by the ion repulsion engine of this invention which combines the best features of the internal combustion reciprocating engine with the technology of fuel cells. The result is a highly efficient external combustion engine. Basically, a piston engine of the well-known type is provided with a first conductive porous electrode typically located in the space between the piston and cylinder head, connected by an electrical conductor to a second porous conductive electrode in another housing either outside the engine or within a separate cylinder of the engine. When air is compressed in the first porous electrode by the piston and fuel is fed to the second porous electrode, an electron flow occurs moving from the oxygen atoms through the first porous electrode, through the conductor to and through the second porous electrode to the fuel atoms due to the valence attraction of fuel atoms for the oxygen electrons. This current flow causes oxygen in the air in the first porous electrode to be ionized with an excess of positive charges and the fuel to be ionized with an excess of negative charges. An elevated temperature of both the fuel and air electrodes will preferably be maintained to enhance the fuel/air reaction in producing ionization. This ionization occurs in the same manner as in a fuel cell, but in the absence of an electrolyte between the electrodes. The mutual repulsion of the ions in the cylinder space, in accordance with Coulomb's Law, as detailed below, exert high pressure on the piston, causing it to move in a power stroke. The ionized air from the cylinder space and the ionized fuel from the second porous electrode are exhausted to an exhaust system including a combustion chamber, where the chemical reaction is completed. The oppositely charged fuel and oxygen ions are strongly attracted toward each other and will rapidly and completely react.

In the described process, although the valence attraction between fuel atoms and oxygen electrons is operative continuously, the air molecules in general are so widely distributed as to provide little molecular contact with the electrically conductive porous electrode which is electrically joined to the second electrode by the conductor. In this case, little if any current flow (i.e., ionization) can occur. However, as air is compressed into the porous conductive electrode, the oxygen density increases to a point where sufficient gas molecules contact the conductive electrode for a significant ionization current to flow.

In order to prevent premature ionization in the first porous electrode, a counter electromotive force may be induced in the inter-electrode conductor during the piston compression stroke opposite to that which occurs during ionization. This may also be used as a throttling device to control the speed and power of the engine.

If desired, the second porous conductive electrode may be contained within (or in a housing connected to) another cylinder of the same engine. Then, that other cylinder will operate by pressure generated by ionized fuel in the same manner as with the ionized air discussed above.

BRIEF DESCRIPTION OF THE DRAWINGS

Details of this invention and preferred embodiments thereof will be further understood upon reference to the drawing, wherein:

FIGS. 3(a) through 3(d) schematically illustrate the several strokes in one complete cycle of the engine embodiment of FIG. 1;

FIG. 4 is a schematic representation of an alternative embodiment of an ion repulsion engine;

FIGS. 5(a) through 5(d) schematically illustrate the several strokes in one complete engine operating cycle for the engine embodiment of FIG. 4;

FIG. 6 is a schematic representation of a second alternative embodiment of an ion repulsion engine.

DETAILED DESCRIPTION OF THE INVENTION

Figure 1:
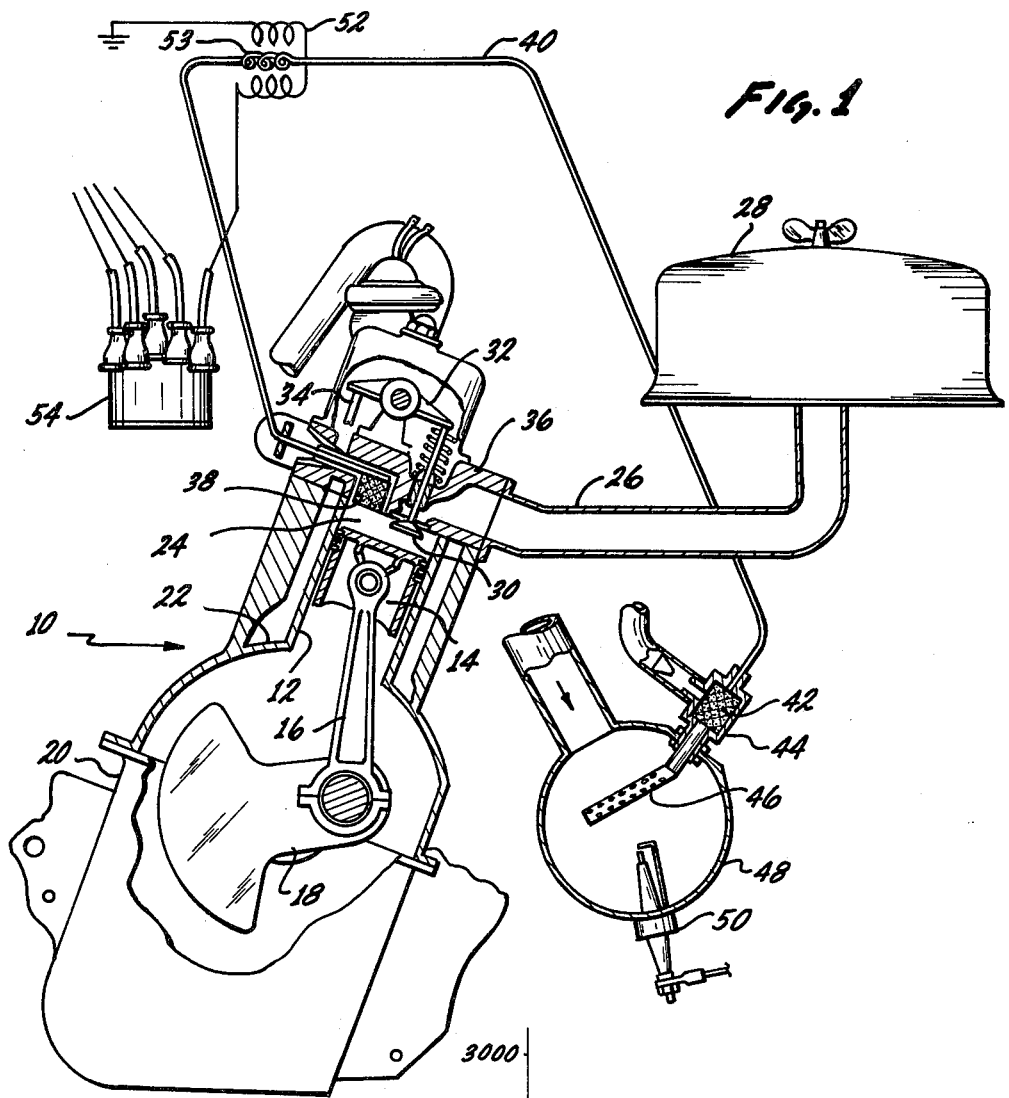
FIG. 1 is a schematic representation, partially cutaway, of an ion repulsion engine according to this invention.

Referring now to FIG. 1, there is seen a schematic representation of an ion repulsion engine 10, partially cut away from clarity. Engine 10 is basically similar to a conventional internal combustion engine, having a plurality of cylinders 12 in line (as shown) or in a "V," radial or other configuration, as desired. A piston 14 is slidably positioned in each cylinder 12. A connecting rod 16 connects each piston 14 to a crankshaft 18 which drives a power output means (not shown) such as the driving wheels of an automobile. Crankshaft 18 is contained within a conventional engine block 20. Coolant may be passed through passages 22 and a lubricating oil may be contained within block 20 in the usual manner. Ideally, the only heat produced within the engine would result from adiabatic compression of the gases and some unavoidable friction. However, it is expected that inefficiencies will develop in converting the ion repulsion produced pressure to work and this will show up as heat during the final chemical reaction in the combustion chamber space. This will occur external to the engine cylinder, so that only minimal cooling of the cylinder will be required.

Air is admitted into cylinder space 24 above piston 14 through tube 26 from conventional air filter 28 when intake valve 30 is open. Valve 30 is operated in a conventional manner by rocker arm 32 and pushrod 34, driven by a conventional cam shaft (not shown) designed to open valve 30 at the proper time, as discussed in detail below. An exhaust valve and valve operating assembly (not shown) are located behind intake valve 30 and operate in a similar manner.

Valve 30 is located within cylinder head 36, which differs from the common internal combustion engine in having a space containing a porous conductive electrode 38.

Porous electrode 38 comprises any suitable conductive material providing a large surface area-to-volume ratio. The large surface area is desirable to expose as much surface of the electrode as possible to contact with the oxygen molecules so that oxygen electrons can be attracted to flow to and through the electrode. Typical materials include felted metal fibers, porous carbon, porous nickel, etc. Good results would be expected with a material such as "Feltmetal," a sintered fine wire mass available from Fiber Metal Products, Brunswick Corporation, Skokie, Ill. An ideal porous electrode material would be selected from materials having high electrical conductivity and containing many interconnecting pores shaped for efficient gas or vapor flow. The material should occupy a minimum volume and may incorporate any suitable catalytic material to improve ionization. The material should be resistant to chemical attack and have sufficient strength to withstand the differential pressures present during engine operation. Both porous electrodes 38 and 42 may be of the same or similar construction, each utilizing if desired a catalyst suited to its individual function. A heating means may also be incorporated into either or both electrodes as desired to provide means to maintain optimum electrode operating temperatures. Any suitable conductive material may be used in electrode 38. Typical materials include platinum, rhodium, palladium, ruthenium, oxides of copper, silver, gold, nickel and cobalt-aluminum-iron or manganese-silver alloys.

Porous electrode 38 is electrically insulated from cylinder head 36 by any suitable material, such as ceramic materials. An electrical conductor 40 connects porous electrode 38 to a second, generally similar, electrode 42 within housing 44.

A suitable fuel is passed through porous conductive electrode 42, then through tube 46 into combustion chamber 48. The exhaust from cylinder space 24 also passes to combustion chamber 48 from an exhaust valve (not shown) in cylinder head 36. Combustion of fuel and air in combustion chamber 48 is assured by an ignition means 50 such as a spark plug or a glow plug. Thereafter, the products of combustion pass to the atmosphere through an exhaust pipe (not shown) connected to combustion chamber 48. Since the oppositely charged oxygen and fuel ions are attracted to each other, little mixing is necessary in combustion chamber 48. Also, since much of the energy in the fuel and air will have been extracted during the post-ionization expansion (and work done in moving the pistons) the gases entering combustion chamber 48 are cool and ideally produce relatively little heat as the chemical reaction is completed.

A primary coil means 52 adjacent to secondary coil 53 in conductor 40 is arranged to induce a current in conductor 40 in one direction or the other according to a timed sequence set by conventional timing means 54, which operated in a manner similar to a conventional distributer. Timing means 54 sends signals to coil 52 at the appropriate times during the engine operating cycle, as detailed below.

This ion repulsion engine operates on the same principle as do fuel cells. The first porous conductive electrode 38 within cylinder space 24 and the second porous electrode 42 in housing 44 act as the two fuel cell electrodes in which oxygen and fuel are ionized. In a conventional fuel cell, a conductor extends from one electrode to a load, then to the other electrode, with the fuel/oxygen reaction taking place in an electrolyte between the electrodes. In the ion repulsion engine, conductor 40 serves to conduct electrons between electrodes during oxygen and fuel ionization, while the oxygen/fuel reaction takes place in combustion chamber 48 after work is performed by ionized gas pressure on piston 14.

Pressure is exerted on piston 14 (and, of course, all of the walls of cylinder space 24) by the oxygen being ionized in porous electrode 38 in accordance with Coulomb's Law. Coulomb's Law, the basic hypothesis of electrochemistry, is the inverse square law of force between two charged particles "$e_1$" and "$e_2$" separated by a distance "r," the force being given by:

$$F = e_1 e_2 r / r^3$$

Where the charges on particles "$e_1$" and "$e_2$" are "$Q_1$" and "$Q_2$," respectively, the forces acting along the line joining the two particles, or Coulomb interaction, has the magnitude:

$$F = K Q_1 Q_2 / r^2$$

If the charges are of the same sign, "F" is positive and the force is a repulsion. The Coulomb interaction is very much greater than the gravitational attraction between bodies. For two protons, the ratio of the Coulomb to the gravitational force is:

$$\frac{e^2/r^2}{G m_p^2/r^2} = \frac{e^2}{G m_p^2}$$

where $G = 6.66 \times 10^{-8}$ g$^{-1}$ cm$^3$ sec$^{-2}$ (the gravitational constant) and "$m_p$" and "e" are the mass and charge, respectively, of the proton. Since $e/m_p = 2.9 \times 10^{14}$ electrostatic units/g, the ratio of the forces is $1.3 \times 10^{36}$ for the two protons. For two electrons the ratio is greater again by a factor of $3 \times 10^7$. The huge strength of the Coulomb interaction is put to use in the ion repulsion engine in which an ionized gas having particles of a single charge is highly compressed in cylinder space 24, then allowed to ionize and exert these very high repulsive forces on piston 14.

Figure 2:
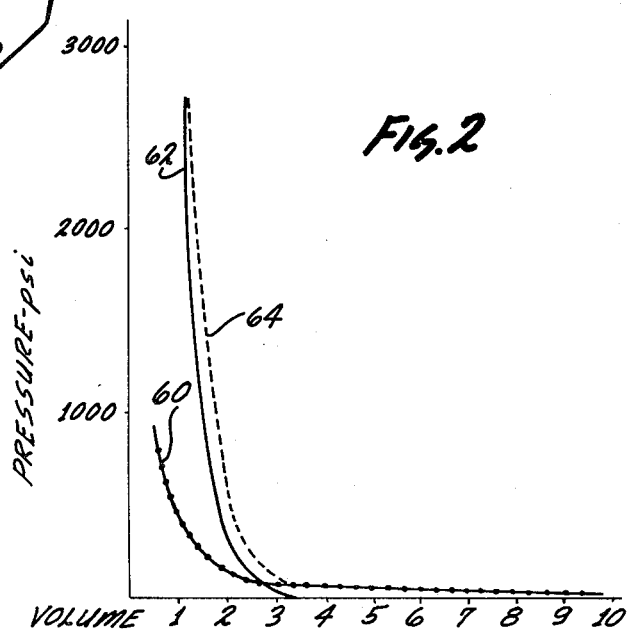
FIG. 2 is a plot of volume against pressure illustrating the approximate effects of adiabatic compression, ionization and the combination thereof.

The pressures generated in an ion repulsion engine at typical ionization levels are graphically indicated in FIG. 2. In FIG. 2, pressure is plotted against volume as the air is compressed and the air is ionized. Curve 60 shows the increase in pressure due simply to adiabatic compression as the air volume is reduced from 10 units to less than 2 units of volume. Curve 62 illustrates the increase in pressure due solely to 15.75% air ionization, neglecting any thermal effects of ionization. As can be seen the pressure increase is much greater than that due solely to adiabatic compression. Curve 64 shows the total pressure due to both compression and ionization, with 15.75% ionization and again neglecting any thermal effects of ionization. As these curves illustrate, very high pressure is developed, which is put to use in driving the engine to produce useful work. The pressure due to ionization shown in curves 62 and 64 accounts for only the repulsive forces between two adjacent like-charged ions and neglects the considerable additional forces produced by interaction with other adjacent ions.

Any suitable gases may be used in this engine. While pure oxygen may give higher efficiency in cylinder space 24, air is preferred because of the convenience and ready availability. Any suitable fuel may be supplied to porous electrode 42. Typical fuels include hydrogen, methane, propane, butane, carbon monoxide, methanol, glucose, gasoline and mixtures thereof. With the more complex hydrocarbon fuels, a catalytic agent may be included in porous electrode 44, or upstream thereof, to aid in breaking down and ionizing the larger molecules.

Operation of the ion repulsion engine embodiment seen in FIG. 1 is schematically illustrated in FIGS. 3(a) through 3(d) which show one cylinder of an engine in the operating sequence.

FIG. 3(a) schematically illustrates the air intake stroke. Intake valve 70 is open, allowing air to be drawn in through intake tube 72 in the direction of arrow 74 as piston 76 moves downwardly in the direction of arrow 78. Air flows into cylinder space 80 with exhaust valve 82 closed. Fuel remains in housing 83, having entered through tube 86. Timer 88 need not influence ionization current flow at this point since without severe densification (compression) sufficient air would not be in intimate contact with porous electrode 90 to produce appreciable ionization. Air may be driven through tube 72 by a conventional supercharger, if desired, to increase air flow and compression efficiency. As piston 76 reaches the bottom of the intake stroke, intake valve 70 closes and piston 76 begins to move upwardly in the compression stroke schematically illustrated in FIG. 3(b).

Piston 76 is moving upwardly, compressing air in cylinder space 80 into porous electrode 90. Timer 88 has connected primary winding 52 to a source of current 89 through conductor 100 causing a direct current to flow which induces an electrical potential in secondary winding 95 in the direction of arrow 97. This potential opposes the flow of electrons which occurs when air is ionized in porous electrode 90. This serves to retard ionization during the early stages of the compression stroke. As piston 76, moving in the direction of arrow 102, nears the top of the stroke, timer 88 disconnects primary winding 52 from the source of current 89, thus removing the induced electric potential from conductors 94 and 96, and permitting electrons to flow between first porous electrode 90 and second porous electrode 92. If desired, an additional current may be imposed in the same direction as the ionization current, to improve the speed and completeness of ionization. As discussed above, the valence attraction of the fuel atoms in second electrode 92 for the oxygen atoms compressed into first porous electrode 90 initiates the electron flow. The resulting ionized particles, in accordance with Coulomb's Law produces a pressure within cylinder space 80 which serves to drive piston 76 downwardly during the power stroke illustrated in FIG. 3(c). Similarly, ionization of fuel in second electrode 42 causes a pressure increase there, forcing the expanding fuel ions into combustion chamber 114.

Piston 76 moves in the direction of arrow 106, producing work through a crankshaft (not shown) connected to connecting rod 108. Oxygen ions in and around porous electrode 90 produce the required pressure by ion repulsion. Current flows between the porous electrodes 90 and 92 through conductors 94, 95 and 96. As piston 76 reaches the bottom of the power stroke, exhaust valve 82 opens and the piston begins to move upwardly in the exhaust stroke schematically illustrated in FIG. 3(d).

As piston 76 moves in the direction of arrow 110, ionized air in cylinder space 80 is forced out through now opened exhaust valve 82, through exhaust tube 112 into combustion chamber 114. Combustion between ionized air and ionized fuel is triggered, if necessary, by an ignition means 116, such as a glow plug. The products of combustion (usually, water and/or carbon dioxide) are vented to the atmosphere. The reaction in combustion chamber 114 is relatively cool, due to the energy extracted in cylinder space 80. The combustion reaction is primarily due to the attraction of unlike charges in fuel and air, with ignition means 116 serving only to assure that the reaction is complete and no unburned hydrocarbons are vented to the atmosphere. Since temperatures are relatively low both in cylinder space 80 and combustion chamber 114, reactions which produce pollutants such as $NO_2$ are unlikely to occur. The current flowing through conductors 94 and 96 during ionization could be tapped for use in battery charging, or automobile lights or auxiliary systems.

A schematic representation of an alternative embodiment of the ion repulsion engine of this invention is illustrated in FIG. 4. The engine 210 typically has a plurality of cylinders 212 arranged in an in-line, "V," radial or other arrangement. For simplicity, a single cylinder is shown. A piston 214 which is slidably positioned within cylinder 212 reciprocates therein, driving a crankshaft 218 through connecting rod 216, all located within an engine block 220. The engine is cooled by a liquid coolant circulated through passages 222 in block 220. Alternatively, the engine may be air-cooled. As piston 214 reciprocates, a cylinder space 224 above the piston changes volume. A cylinder head 226 closes the top of cylinder space 224.

At least one intake valve 228 and at least one exhaust valve 230 connect with cylinder space 224. Each valve is biased towards the closed position by a spring 232. The valves are opened by any suitable means, such as conventional rocker arms (not shown) which push downwardly on the upper ends of the valves. A tube 234 directs air to intake valve 228 from a conventional air filter. If desired, oxygen from a standard oxygen storage tank could be used. A similar tube 238 receives exhaust gases from exhaust valve 230 and directs them to combustion chamber 240, as discussed below.

A pair of first porous conductive electrodes 242 and 244 are contained within first housings 246 and 248, respectively, adjacent to the cylinder portion of block 220. These housings may be positioned at any suitable location near the cylinders. Each of the housings 246 and 248 communicates with cylinder space 224 through small holes 250 and 252 in the cylinder walls and larger tubes 254 and 256 within the housings. The ends of tubes within the housings may be opened or closed selectively by valves 258 and 260, respectively. These valves may be moved between the open and closed positions by any suitable means, such as a conventional rocker arm, pushrod and camshaft arrangement (not shown).

A second porous conductive electrode 264 is contained in a housing 266 adjacent to combustion chamber 240. Fuel is admitted to second electrode 264 through a tube 268 and nozzle 270 arrangement. Fuel from porous electrode 264 enters combustion chambers 240 through burner 272 where it contacts exhaust gases from tube 238. Combustion completion is assured by an ignition means 274, such as a spark plug or glow plug. The resulting combustion products are exhausted to the atmosphere through conventional exhaust pipes, mufflers, etc. (not shown).

An electrical conductor 276 connects first porous electrodes 242 and 244 to second porous electrode 264. Conductor 276 and the electrodes are, of course, electrically insulated from the housings and other engine components. Conductor 276 passes through a conventional timer 280 which governs the ionization current flow through conductor 276.

Since in this embodiment ionization is assumed to take place more slowly than in the embodiment of FIG. 1, an ionization suppressing current need not always be used during the early portion of the compression stroke. However, a coil and control means such as were described in conjunction with FIG. 1 may be used if desired.

The sequence of operation of the alternative embodiment of FIG. 4 is schematically illustrated in FIGS. 5(a) through 5(d). Component reference numerals in these Figures will be the same as in FIG. 4.

The first intake stroke is illustrated in FIG. 5(a). First porous electrode housing valves 258 and 260 are closed, as is exhaust valve 230. Air enters cylinder space 224 through tube 234 and valve 228 as piston 214 moves downwardly. Meanwhile, fuel is being introduced into second porous electrode 264.

Upon completion of the downward movement of piston 214, the first compression stroke begins as piston 214 begins its upward movement, as shown in FIG. 5(b). The electrical circuit between electrodes through conductor 276 may be closed at this time to continue ionization of any charge from a previous cycle in first electrodes 242 and/or 244, as discussed below. Intake valve 228, exhaust valve 230 and valve 260 are closed, while valve 258 is open so that as air is compressed by piston 214, it can enter housing 246. During the early portion of compression, timer 280 may hold the circuit through conductor 276 to a neutral electric potential, to prevent premature ionization of the air being compressed by preventing flow of ionization electrons through conductor 276. If desired, a reverse current flow could be used as described in conjunction with FIG. 1, above. When piston 214 nears the top of the compression stroke, timer 280, by proper timing and sequencing of DC current through primary winding 281, controls ionization electron current through secondary winding 282 and conductor 276; valve 258 is closed and ionization can take place in housing 246. Electrons move through conductor 276 from first porous electrode 242 to second porous electrode 264, producing ionized air in housing 246 (positive charges) and ionized fuel in housing 266 (negative charges). High pressure is generated in housing 246 due to the mutual repulsion of the "like" ions, in accordance with Coulomb's Law, as discussed above. The mutual repulsion of the "like" fuel ions in housing 266 causes similar pressurization and the expulsion of fuel ions into combustion chamber 240, where they will combine with ions from a previous ionied air exhaust stroke. Ignition means 274 assures completion of the fuel/air chemical reaction.

When the engine is started cold, the starter motor will drive the engine through the steps shown in FIGS. 5(a) and 5(b) at least twice to "charge" both housings 246 and 248 with ionizing air. A small amount of ionized fuel may be vented to the atmosphere through combustion chamber 240 during the first few strokes where it will combine with free ions in the atmosphere. Of course, means may be provided to restrict fuel flow to porous electrode 264 during the initial stages of the engine starting process, if desired.

Once the engine is operating, housings 246 and 248 are charged alternately, as detailed below.

After a first compression stroke as shown in FIG. 5(b), a power stroke occurs, as shown in FIG. 5(c). Both housings 246 and 248 contain ionized air, but ionization had had time to proceed further in housing 248, which was charged before housing 246, so pressure is greater therein. Valves 228, 230 and 258 are closed at the start of the first power stroke, and valve 260 opens to admit high pressure ionized air from housing 248 into cylinder space 224, driving piston 214 downwardly.

As piston 214 reaches the bottom of its movement, valve 260 closes and exhaust valve 230 opens.

As piston 214 begins to move upwardly, the first exhaust stroke begins, as illustrated in FIG. 5(d). Ionized air in cylinder space 224 is forced through tube 238 to combustion chamber 240 where it chemically reacts with the ionized fuel ejected into combustion chamber 240 from housing 266 during the ionization steps. Timer 280 maintains the circuit through conductor 276 in a condition favoring continued ionization electron current flow, so that ionization of the air in housings 246 and 248 can continue. As the air in the housings continues to ionize, fuel in second electrode 264 simultaneously ionizes, as described above, forcing ionized fuel into chamber 240 to react with the ionized exhaust air entering from tube 238. As the exhaust stroke ends with the arrival of piston 214 at its uppermost position, exhaust valve 230 is closed and intake valve 228 opens. Valves 258 and 260 remain closed. A second intake stroke begins, identical with the first intake stroke illustrated in FIG. 5(a), described above.

Upon completion of the second intake stroke, a second compression stroke occurs. This is identical to the compression stroke shown in FIG. 5(b), except that valve 258 is closed rather than open and valve 260 is open rather than closed. Porous electrode 242 was charged with air in the first compression stroke, and now porous electrode 244 is charged during the second compression stroke.

Upon completion of the second compression stroke, a second power stroke begins. This power stroke is identical to that illustrated in FIG. 5(c), except that valve 258 is open rather than closed and valve 260 is closed rather than open. Thus, porous electrode 242 which was charged before porous electrode 244 and, therefore, had had more time to complete ionization of the air charge and reach a higher pressure is connected to cylinder space 224 to force piston 214 downwardly.

Upon completion of the power stroke, a second exhaust stroke occurs as illustrated in FIG. 5(d), identical with the first exhaust stroke described above. Upon completion of this second exhaust stroke, the engine has performed its entire cycle and is ready to begin with the first intake stroke again.

At the cost of a slight increase in complexity, the embodiment shown in FIGS. 4 and 5 has the advantage of allowing more time for air ionization to take place in a given air charge. This allows greater engine speed while retaining a desired level of ionization.

An alternative embodiment in which both first and second porous conductive electrodes are located in (or in communication with) cylinder spaces is schematically illustrated in FIG. 6. FIG. 6 shows a vertical section through two cylinders 300 and 302 of a multi-cylinder engine. Cylinders 300 and 302 move through intake, compression, power and exhaust strokes together. Preferably, other cylinders (or pairs of cylinders) will be operated out of synchronization with the first pair to balance engine operation.

Cylinders 300 and 302 house pistons 304 and 306, respectively, shown near the start of an intake stroke, as indicated by arrows 308 and 310. A first porous conductive electrode 312 is contained within cylinder space 314 in cylinder 300. Similarly, a second porous conductive electrode 316 is located within cylinder space 318 within cylinder 302. The two electrodes are electrically insulated from metal engine components.

A primary coil 324 activated by a timer 326 operating from a direct current source 328 induces an ionization retarding current in secondary coil 322 when necessary, in the manner described above.

During the intake stroke shown, air enters cylinder space 314 through intake tube 330 past now-open intake valve 332. Meanwhile, fuel is injected into cylinder space 318 in a vapor state through injection nozzle means 334.

When pistons 304 and 306 reach the bottom of the intake stroke and start upward in the compression stroke, intake valve 332 is closed and a valve (not shown) within injection means 334 is closed. As compression continues, timer 326 includes an ionization retarding current in conductor 320, as detailed above.

At or near the end of the compression stroke, the retarding current is switched off by timer 326 and ionization commences. If desired, heater means 340 and 342, such as conventional resistance heaters, may be turned on so as to heat porous electrodes 312 and 316, respectively, to enhance ionization.

In the manner described above for the other embodiments, as current flows from first conductive electrode 312 through conductor 320 to second conductive electrode 316 during ionization, repulsive forces of both the oxygen molecules and the fuel molecules drives pistons 304 and 306 downwardly in a power stroke.

Upon completion of the power stroke, pistons 304 and 306 move upwardly in an exhaust stroke. Exhaust valves 342 and 344 open, allowing ionized air and fuel to move into combustion chamber 346 where the fuel/air chemical reaction is completed, with the aid of ignition means 348, if necessary. The resulting mixture of water vapor, carbon dioxide, etc., is exhausted to the atmosphere through pipe 350.

If desired, instead of locating the first and second porous conductive electrodes in cylinder spaces as illustrated in FIG. 6, they could be located in communicating chambers located near the cylinders, such as those shown in FIG. 5. In fact, the electrodes may be located in a pair of closely spaced or contacting chambers positioned between engine cylinders so that conductor 320 can be made very short and, thus, more efficient.

While certain specific arrangements, materials and proportions were described in the above description of preferred embodiments, these may be varied or modified, where suitable, with similar results. For example, an engine similar to that shown in FIG. 4 could be built with only a single first porous electrode in a single outside housing. This variation could operate in a manner similar to the embodiment of FIG. 1, but with ionization taking place in the external housing rather than in a porous electrode in the cylinder space.

Other variations, ramifications and applications of this invention will occur to those skilled in the art upon reading this disclosure. These are intended to be included within the scope of this invention, as defined by the appended claims.

What is claimed is:

1. In a reciprocating engine having at least one cylinder closed at one end by a cylinder head and having a slidable piston located in said cylinder defining a cylinder space between said head and said piston, at least one intake valve communicating between said cylinder space and a source of an oxygen-containing gas and at least one exhaust valve communicating between said cylinder space and an exhaust system, the improvement comprising:
   at least one first enclosed porous conductive electrode in fluid flow communication with said cylinder space;
   at least one second enclosed porous conductive electrode in fluid flow communication with said exhaust system;
   an electrical conductor connectable between said first and second electrodes;
   means permitting said oxygen containing gas to be compressed in said first electrode during movement of said piston toward said cylinder head; and
   means for feeding fuel to said second electrode;
   whereby oxygen is ionized in said first electrode as said air is compressed, electrons flow through said conductor to said second electrode to ionize fuel therein, providing an increase in pressure in said cylinder space due to ion repulsion.

2. The improvement according to claim 1 further including a combustion chamber adapted to receive ionized air exhausted from said cylinder space and ionized fuel from said second electrode, said chamber including an ignition means to assure completion of a chemical reaction between said air and said fuel.

3. The improvement according to claim 1 wherein said first electrode is located within said cylinder space and further including means to impose a current in said conductor opposite to the electron flow therethrough during ionization whereby ionization may be suppressed during at least a portion of the compression period.

4. The improvement according to claim 1 wherein said first electrode is located in a housing outside said cylinder space and includes a means to permit gas flow between said housing and said cylinder space.

5. The improvement according to claim 1 including at least two housings in fluid flow communication with said cylinder space, a first electrode within each of said housings, and valve means selectively closing off each of said housings from said cylinder space.

6. The improvement according to claim 1 wherein said second electrode is housed in fluid flow communication with a second cylinder space in a second cylinder of the same engine, and further including means permitting said fuel to be compressed in said second electrode, whereby said fuel provides an increase in pressure in said second cylinder space due to ion repulsion.

7. In the method of operating a reciprocating engine in which at least one piston is moved back and forth in at least one cylinder to increase and decrease the cylinder space between the piston and a cylinder head closing one end of the cylinder, the improvement comprising:
   installing at least one enclosed first porous conductive electrode in fluid flow communication with said cylinder space;
   installing at least one second porous conductive electrode in a housing;
   electrically connecting said first and second electrodes;
   introducing and oxygen-containing gas into said cylinder space as said piston is moved away from said cylinder head;
   introducing fuel into said second electrode;
   compressing said oxygen and said fuel to ionize in said first and second electrodes, respectively;
   allowing the ion repulsion forces of the ionized oxygen in said first electrode to drive said piston away from said cylinder head to perform work; and
   moving said piston toward said cylinder head and opening an exhaust valve communicating with said cylinder space to exhaust ionized gas therefrom.

8. The improvement according to claim 7 including the further step of directing said ionized exhausted gas and ionized fuel from said second electrode to a combustion chamber and igniting the resulting mixture to assure completion of an oxygen/fuel reaction.

9. The improvement according to claim 7 wherein said first electrode is installed directly in said cylinder space and including the further step of imposing a current during at least part of the compression step on said conductor in a direction opposite to the direction of electron flow therethrough during ionization, to suppress premature ionization.

10. The improvement according to claim 7 wherein at least two first electrodes are each installed in a housing having a valved fluid flow connection with said cylinder space, whereby each compression step compresses oxygen-containing gas into one housing and said compressed gas may be retained therein by closing said valve.

11. The improvement according to claim 7 wherein said second electrode housing is in fluid flow communication with a second cylinder space in a second cylinder of the same engine and further including the steps of compressing said fuel in said second electrode by moving the second piston toward the cylinder head of said second cylinder, and allowing ion repulsion forces of ionized fuel in said second electrode to drive said second piston away from said second cylinder head to perform work.

* * * * *